United States Patent
Thimmisetty et al.

(10) Patent No.: US 12,278,802 B2
(45) Date of Patent: Apr. 15, 2025

(54) COMBINED MACHINE LEARNING AND FORMAL TECHNIQUES FOR NETWORK TRAFFIC ANALYSIS

(71) Applicant: Palo Alto Networks, Inc., Santa Clara, CA (US)

(72) Inventors: Charanraj Thimmisetty, Dublin, CA (US); Praveen Tiwari, Milpitas, CA (US); Viswesh Ananthakrishnan, Palo Alto, CA (US); Claudionor Jose Nunes Coelho, Jr., Redwood City, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 565 days.

(21) Appl. No.: 17/447,471

(22) Filed: Sep. 13, 2021

(65) Prior Publication Data
US 2022/0385635 A1   Dec. 1, 2022

Related U.S. Application Data

(60) Provisional application No. 63/202,117, filed on May 27, 2021.

(51) Int. Cl.
*H04L 9/40* (2022.01)
*G06F 18/214* (2023.01)
*G06N 3/04* (2023.01)

(52) U.S. Cl.
CPC ........ *H04L 63/0263* (2013.01); *G06F 18/214* (2023.01); *G06N 3/04* (2013.01);
(Continued)

(58) Field of Classification Search
CPC ............ H04L 63/0263; H04L 63/0236; H04L 63/1425; H04L 63/20; G06F 18/214; G06N 3/04
(Continued)

(56) References Cited

U.S. PATENT DOCUMENTS 6,301,613 B1 * 10/2001 Ahlstrom ............ H04L 41/0873
                                                     709/223
10,402,589 B1 * 9/2019 Madisetti .............. G06F 21/552
(Continued)

FOREIGN PATENT DOCUMENTS

KR      20200013040 A  *  2/2020  ............. G06F 21/60

OTHER PUBLICATIONS

Lubna et al. "Firewall log analysis and dynamic rule re-ordering in firewall policy anomaly management framework," IEEE, DOI: 10.1109/ICGCE.2013.6823553, Jun. 2, 2014. (Year: 2014).*
(Continued)

*Primary Examiner* — Peter C Shaw
(74) *Attorney, Agent, or Firm* — Gilliam IP PLLC

(57) ABSTRACT

A system generates vector representations of entries of traffic logs generated by a firewall. A first model learns contexts of values recorded in the logs during training, and the system extracts vector representations of the values from the trained model. For each log entry, vectors created for the corresponding values are combined to create a vector representing the entry. Cluster analysis of the vector representations can be performed to determine clusters of similar traffic and outliers indicative of potentially anomalous traffic. The system also generates a formal model representing firewall behavior which comprises formulas generated from the firewall rules. Proposed traffic scenarios not recorded in the logs can be evaluated based on the formulas to determine actions which the firewall would take in the scenarios. The combination of models which implement machine learning and formal techniques facilitates evaluation of both observed and hypothetical network traffic based on the firewall rules.

20 Claims, 9 Drawing Sheets

(52) U.S. Cl.
CPC ...... *H04L 63/0236* (2013.01); *H04L 63/1425* (2013.01); *H04L 63/20* (2013.01)

(58) Field of Classification Search
USPC .......................................................... 726/11
See application file for complete search history.

(56) References Cited

U.S. PATENT DOCUMENTS

| | | | |
|---|---|---|---|
| 11,075,951 B1* | 7/2021 | Kats | H04L 63/20 |
| 11,245,614 B1* | 2/2022 | Backes | H04L 12/4641 |
| 2012/0017260 A1* | 1/2012 | Narain | G06F 21/6209 726/1 |
| 2015/0082370 A1* | 3/2015 | Jayaraman | H04L 63/20 726/1 |
| 2017/0048116 A1* | 2/2017 | Anderson | H04L 43/028 |
| 2021/0232955 A1* | 7/2021 | Alba | G06F 40/268 |
| 2021/0234833 A1* | 7/2021 | Schneider | G06N 3/08 |
| 2022/0166756 A1* | 5/2022 | Gupta | H04L 41/16 |

OTHER PUBLICATIONS

Golnabi et al., "Analysis of Firewall Policy Rules Using Data Mining Techniques, " 2006 IEEE/IFIP Network Operations and Management Symposium NOMS 2006, Vancouver, BC, Canada, 2006, pp. 305-315, doi: 10.1109/NOMS.2006.1687561. (Year: 2006).*

Katic et al., "Optimization of Firewall Rules," 2007 29th International Conference on Information Technology Interfaces, Cavtat, Croatia, 2007, pp. 685-690, doi: 10.1109/ITI.2007.4283854. (Year: 2007).*

Haghighi et al., "A Machine Learning-based Approach to Build Zero False-Positive IPSs for Industrial IoT and CPS with a Case Study on Power Grids Security," in IEEE Transactions on Industry Applications, doi: 10.1109/TIA.2020.3011397. (Year: 2020).*

Agrawal et al., "Policy ratification," Sixth IEEE International Workshop on Policies for Distributed Systems and Networks (Policy'05), Stockholm, Sweden, 2005, pp. 223-232, doi: 10.1109/POLICY.2005.25. (Year: 2006).*

Arkoudas et al., "Automated Policy Analysis," 2012 IEEE International Symposium on Policies for Distributed Systems and Networks, Chapel Hill, NC, USA, 2012, pp. 1-8, doi: 10.1109/POLICY.2012.11. (Year: 2012).*

Youssef et al., "Automatic verification of conformance of firewall configurations to security policies, " 2009 IEEE Symposium on Computers and Communications, Sousse, Tunisia, 2009, pp. 526-531, doi: 10.1109/ISCC.2009.5202309. (Year: 2009).*

Bringhenti et al., "Automated optimal firewall orchestration and configuration in virtualized networks," NOMS 2020—2020 IEEE/IFIP Network Operations and Management Symposium, Budapest, Hungary, 2020, pp. 1-7, doi: 10.1109/NOMS47738.2020.9110402. (Year: 2020).*

Yoon et al., "Minimizing the Maximum Firewall Rule Set in a Network with Multiple Firewalls," in IEEE Transactions on Computers, vol. 59, No. 2, pp. 218-230, Feb. 2010, doi: 10.1109/TC.2009.172. (Year: 2010).*

Liu et al., "Formal Verification of Firewall Policies," 2008 IEEE International Conference on Communications, Beijing, China, 2008, pp. 1494-1498, doi: 10.1109/ICC.2008.289. (Year: 2008).*

Joshi, et al., "A Review of Network Traffic Analysis and Prediction Techniques", arXiv preprint arXiv:1507.05722v2, retrieved on May 5, 2021 from https://arxiv.org/ftp/arxiv/papers/1507/1507.05722.pdf, 2015, 22 pages.

* cited by examiner

COMBINED MACHINE LEARNING AND FORMAL TECHNIQUES FOR NETWORK TRAFFIC ANALYSIS

BACKGROUND

The disclosure generally relates to digital data processing and to security arrangements for protecting computers.

Firewalls monitoring incoming and outgoing network traffic can record network traffic information in firewall logs. Logs captured by a firewall indicate source and destination Internet Protocol (IP) addresses, port numbers, and protocols, for example. Analysis of firewall logs facilitates debugging of the firewall, such as to determine whether existing firewall rules should be modified or new firewall rules should be added to result in blocking undesirable network traffic that is allowed by current policy. Firewall logs can also be analyzed to determine characteristics of the network traffic intercepted by the firewall which is allowed or denied based on the set of firewall rules being applied.

BRIEF DESCRIPTION OF THE DRAWINGS

Embodiments of the disclosure may be better understood by referencing the accompanying drawings.

DESCRIPTION

Figure 1:
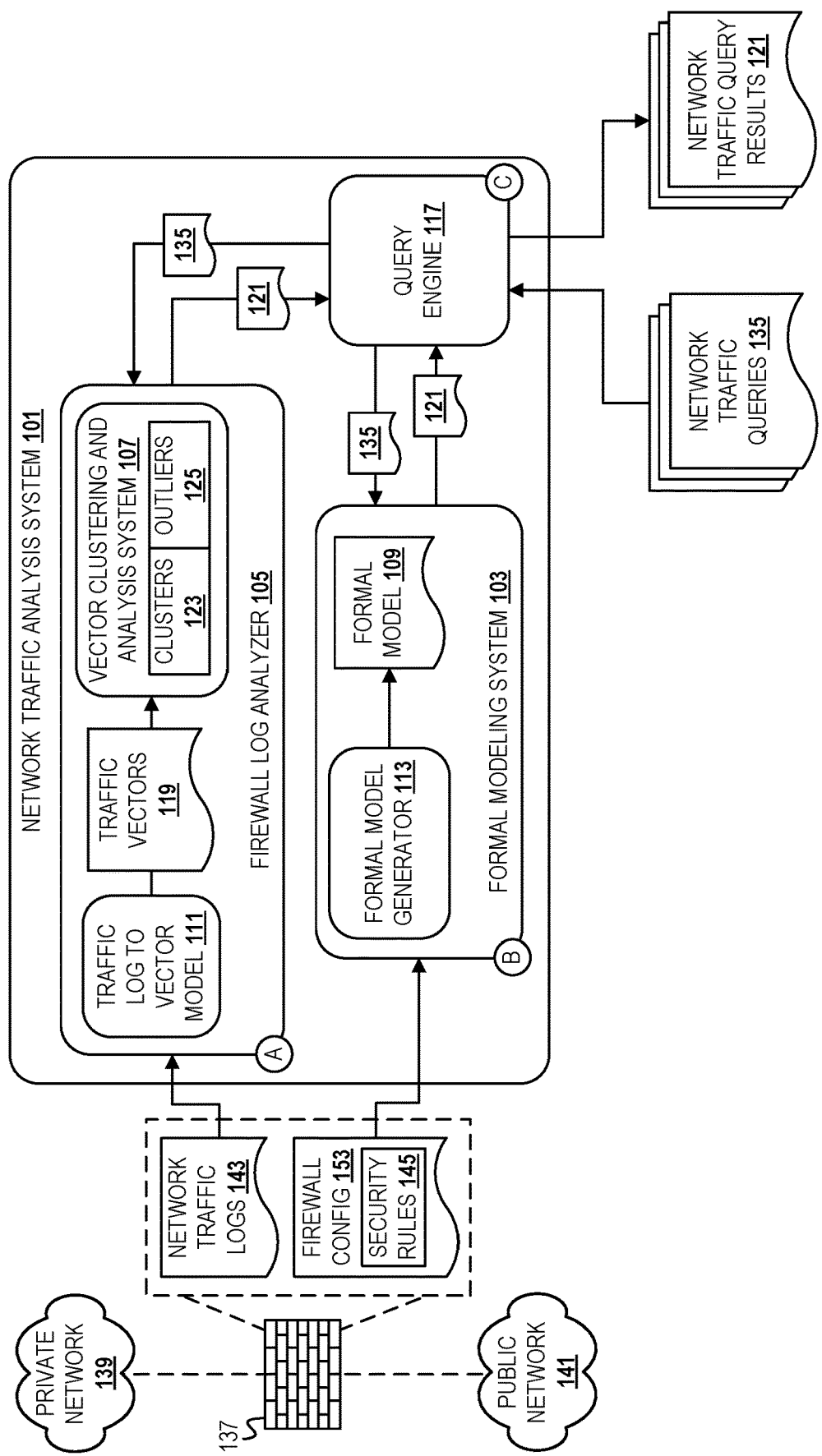
FIG. 1 depicts a conceptual diagram of combining machine learning and formal techniques for obtaining insights into behaviors observed or potentially observable within a network based on traffic logs and firewall policy.

The description that follows includes example systems, methods, techniques, and program flows that embody aspects of the disclosure. However, it is understood that this disclosure may be practiced without these specific details. For instance, this disclosure refers to performing cluster analysis with k-means clustering in illustrative examples. Aspects of this disclosure can be also applied to other unsupervised learning techniques which can be implemented for clustering of vectors. In other instances, well-known instruction instances, protocols, structures and techniques have not been shown in detail in order not to obfuscate the description.

Overview

Because network traffic patterns generally are not preexisting knowledge, the task of ongoing monitoring and analysis of network traffic detected and logged by a firewall to discover patterns and identify anomalous network traffic poses a challenge. Once anomalous network traffic has been identified, detailed analysis of the network traffic entails also detecting and identifying similar network traffic, including among IP addresses, application, and security zones, resulting in cascading debug iterations. A combined approach of analyzing both observed and hypothetical behavior in a network as disclosed herein facilitates detection of anomalous network traffic and analysis of whether similar or other undesirable network traffic would be allowed or blocked based on current firewall rules. Network traffic which both is and would be allowed or blocked by the firewall with its existing configuration can be determined to provide for enhanced firewall debugging abilities as well as discovery of correlations among behaviors in the network as a result.

A system first creates n-dimensional vector representations of entries of traffic logs generated by a firewall. The system utilizes a first model which learns contexts of values, such as IP addresses, protocols, application identities, and port numbers, as they appear in traffic logs during training of the first model. The system can then extract vector representations of the values resulting from training the model, where the vectors are created in a high dimensional vector space of $R^N$ for some N representing each of the unique values recorded in the traffic logs. Additionally, two vectors can be used to compare the distance between two protocol entities (e.g., "HTTP" and "10.10.10.1") with respect to the logs. For each entry in the traffic logs, the system then combines vectors corresponding to the values recorded therein to produce a vector representing the log entry (e.g., through vector concatenation/addition). The system can perform cluster analysis of the resulting vector representations of the traffic log entries to determine clusters which represent similar network traffic and vectors identified as outliers that are potentially indicative of anomalous network traffic.

Because analyzing existing traffic logs and their corresponding vector representations alone may result in false conclusions as a result of a limited dataset for network traffic analysis, the system also generates a formal model based on a set of firewall rules. The formal model represents behavior of the firewall and comprises formulas representing logical components indicated in the firewall configuration and their relationships indicated in the firewall rules. The system generates the formal model by parsing the firewall rules and converting the rules to formulas comprising an antecedent and consequent, where the antecedent represents the combination of network traffic properties of a firewall rule, and the consequent represents the associated firewall action. The system accepts inputs which indicate one or more properties of network traffic and evaluates the network traffic properties based on the formulas of the formal model to determine if the proposed network traffic could potentially be detected and, if so, whether the firewall would allow or block the network traffic if it were to be detected. Inputs representing network traffic that is similar to the potentially anomalous network traffic identified from cluster analysis may thus be provided as inputs to obtain additional information about the network traffic that would be allowed by firewall policy regardless of whether it is actually detected. The combination of models which implement machine learning and formal techniques are unified by a query engine that is also able to statically search traffic log entries such that both observed and hypothetical network traffic can be evaluated. In effect, the system provides insights into behavior that is both observed and possible within the network being secured by the firewall, thereby also facilitating debugging of the firewall rules.

The first model and the formal model can also be linked to improve or support ongoing development and/or training of the models. Because the outputs of the hypothetical network traffic analysis utilizing the formal model indicate properties of network traffic not reflected in the traffic logs used to train the first model, the outputs provided for network traffic indicated to be possible can be provided as training inputs to the first model for incremental training. Additionally, logged network traffic allowed by the firewall and obtained for training the first model can be used to evaluate the formal model to identify issues that may have been introduced during model generation. Because the network traffic pulled from the logs was observed and thus is known to be possible, network traffic scenarios provided as input for analysis with the formal model are expected to yield an indication that the proposed network traffic is possible (i.e., a solution can be found). If the output from the analysis indicates that the proposed network traffic scenario could not be observed, it can be determined that an issue has occurred during formal model generation, thus improving testing and verification of the formulas of the formal model.

Example Illustrations

FIG. 1 depicts a conceptual diagram of combining machine learning and formal techniques for obtaining insights into behaviors observed or potentially observable within the network based on traffic logs and firewall policy. A firewall 137 monitors incoming and outgoing network traffic for a private network 139. For instance, the firewall 137 detects network traffic sent over a public network 141 (e.g., the Internet) which indicates a destination address corresponding to the private network 139. The firewall generates network traffic logs ("logs") 143 based on detection and recording of network traffic. Characteristics of detected network traffic recorded in entries of the logs 143 can include a protocol, zone(s), source/destination IP addresses, source/destination port numbers, and/or application which the firewall 137 determined from the detected network traffic, such as from inspection of packet headers. The firewall 137 may implement packet inspection and/or application identification to determine additional information beyond that which is indicated in packet headers. Such information about detected network traffic that is recorded in the logs 143 is also referred to herein as network traffic characteristics. The configuration of the firewall 137 is also specified by a firewall configuration 153. The firewall configuration 153 may be one or more files which specifies logical entities and network elements of the private network 139 as configuration elements for the firewall 137, such as network interfaces, network addresses, user groups, logging functionality, and network address translation rules, as well as security rules 145. The firewall 137 evaluates detected network traffic based on the security rules 145 indicated in the firewall configuration 153 to determine an action to take on the traffic. Entries in the logs 143 may indicate the action taken by the firewall 137 on the corresponding network traffic as a result of evaluation of the traffic based on the security rules 145.

A network traffic analysis and correlation system ("system") 101 generates a series of models which facilitate network traffic analysis for the private network 139. The system 101 includes a query engine 117 by which queries may be submitted to the system 101 and/or by which other components, services, etc. may communicate with the system 101. The system 101 also includes a firewall log analyzer ("log analyzer") 105 and a formal modeling system ("modeling system") 103. The log analyzer 105 creates and analyzes vector representations of traffic logs generated by the firewall 137 to facilitate determinations of clusters representing similar network traffic and outliers representing potentially anomalous network traffic. The modeling system 103 generates a model which represents behavior/operation of the firewall to facilitate analysis of network traffic which the firewall 137 could potentially detect that may not be reflected in the logs 143 (also referred to herein as "potential/hypothetical network traffic"). The system 101 may be implemented as a service running in a cloud or may be hosted on-premises.

FIG. 1 is annotated with a series of letters A-C. These letters represent stages of operations. Although these stages are ordered for this example, the stages illustrate one example to aid in understanding this disclosure and should not be used to limit the claims. Additionally, stages A and B can occur at least partially in parallel or concurrently. Subject matter falling within the scope of the claims can vary with respect to the order and some of the operations.

At stage A, the log analyzer 105 obtains the logs 143 from the firewall 137. For instance, the firewall 137 can be configurable to periodically upload the logs 143 generated during a given period of time to the log analyzer 105, where the period of time may be a configurable parameter of the firewall 137 and/or log analyzer 105. As an example, the logs 143 may be the logs 143 generated during the last month, last 90 days, etc. The log analyzer 105 provides entries (e.g., rows) of the logs 143 as input to a traffic log to vector model ("model") 111. The model 111 generates embeddings of traffic log data, or vector representations of entries of the logs 143, by utilizing machine learning techniques to learn contexts in which values recorded in the logs 143 are observed, where context of a value recorded in an entry is provided by other values recorded in the entry. Values recorded in a traffic log entry can include values or source IP address, destination IP address, protocol, application, or any other information which the firewall 137 determined from analysis of detected network traffic.

The model 111 generates individual vector representations of each of these values recorded in the logs 143 based on learning contexts similarly to how implementations of word2vec learn contexts of words based on sentences to generate word embeddings, where a traffic log entry is analogous to a sentence and a value recorded in the entry is analogous to a word in the sentence. For each entry in the logs 143, the model 111 then combines (e.g., averages, sums, etc.) the individual vector representations created for the values recorded therein to produce a vector representing the traffic log entry. The model 111 provides traffic vectors 119 as output, where each of the traffic vectors 119 represents a corresponding entry of the logs 143. Distances between those of the traffic vectors 119 which represent similar traffic will be smaller than distances between those of the traffic vectors 119 which represent dissimilar traffic; similarly, those of the traffic vectors 119 representing similar network traffic will have a greater cosine similarity than those which represent dissimilar network traffic. The log analyzer 105 can store or maintain the traffic vectors 119 for subsequent analysis (e.g., in a repository).

A vector clustering and analysis system ("system") 107 of the log analyzer 105 clusters the traffic vectors 119 to create clusters 123. The system 107 can create the clusters 123 of the traffic vectors 119 by implementing a clustering algorithm such as k-means clustering that allows for grouping of vectors by similarity. Each of the clusters 123 may be considered to indicate a pattern in network traffic. The system 107 also identifies outliers 125. The outliers 125 may be those of the traffic vectors 119 which are not members of any of the clusters 123, have a distance from their respective centroid which exceeds a threshold, and/or are members of clusters having a number of members that is below a threshold. The outliers 125 represent logged network traffic that may correspond to anomalous traffic. The log analyzer 105 can store or maintain the clusters 123 and the outliers 125 for subsequent analysis (e.g., in a repository). Generation and use of a model which generates vector representations of traffic log data for clustering and analysis thereof is further described in FIG. 2.

At stage B, the modeling system 103 obtains indications of the security rules 145 from the firewall 137. The modeling system 103 may download the firewall configuration 153 from the firewall 137. A formal model generator ("model generator") 113 of the modeling system 103 generates a formal model 109 based on parsing the security rules 145 and building the formal model 109 from the parsed representations of the security rules 145. The modeling system 103 can comprise a formal engine, such as a statistical machine translation (SMT) engine, which accepts the formal model 109 and indications of one or more characteristics of network traffic that may be detected by the firewall 137 as inputs. The formal engine which utilizes the formal model 109 generates outputs which indicate whether network traffic having the specified characteristics would be blocked or allowed by the firewall 137 based on the security rules 145. Outputs of the formal engine may also specify which of the security rules 145 would be triggered by the network traffic and/or may include a "proof" that indicates other characteristics of the network traffic which would be observed to trigger the determined action by the firewall 137. Generation and use of a formal model are further described in FIG. 3.

At stage C, network traffic query results ("results") 121 are generated based on submission of network traffic queries ("queries") 135 to the query engine 117. The queries 135 may indicate one or more properties of network traffic and/or may include negations (e.g., "protocol=NOT('HTTP')"). The queries 135 may be processed by the log analyzer 105 or the modeling system 103. For instance, the queries 135 submitted to the query engine 117 can be passed to the log analyzer 105 to obtain/display the clusters 123 and/or the outliers 125 to facilitate analysis of patterns of similar network traffic and/or identification of outliers which represent potentially anomalous network traffic captured in the logs 143. The queries 135 submitted to the query engine 117 can also be passed to the modeling system 103 to obtain additional information about behavior of the firewall 137 and activity in the private network 139 that may potentially be observed. The query engine 117 can forward the queries 135 to the appropriate destination. For instance, the log analyzer 105 and modeling system 103 may each expose an application programming interface (API). The query engine 117 can pass the queries 135 to the respective destination via the respective one of the APIs. The results 121 of the queries may thus depend on which of the log analyzer 105 and the modeling system 103 handled the query and provided a result. For instance, the results 121 can indicate the clusters 123 (e.g., in a reduced-dimension vector space, such as a two- or three-dimensional vector space), outliers 125, scenarios of network traffic and corresponding firewall actions generated from utilization of the formal model 109, etc.

Some of the queries 135 can be submitted to facilitate identification of correlations among anomalous network traffic and other network events. For instance, if the results 121 indicate the outliers 125, the respective ones of the results 121 may indicate timestamps associated with the corresponding entries of the logs 143. The timestamps associated with unusual or outlier activity of file transfers, central processing unit (CPU) usage, etc. among endpoints in the private network 139 can then be evaluated to determine correlations between the unusual/outlier activity and the outlier network traffic identified in the outliers 125. As an example, the outliers 125 may indicate that a user within the private network 139 accessed an application for cryptocurrency exchange at a time associated with a first timestamp. If one or more file transfer activities and/or substantially increased CPU usage having a second timestamp(s) shortly after (e.g., within a defined time interval of) the first timestamp can be identified, the correlation between the anomalous network traffic captured in the outliers 125 and the increase in file transfers/CPU usage can result in flagging the correlation as related to a potential breach or other suspicious activity.

Figure 2:
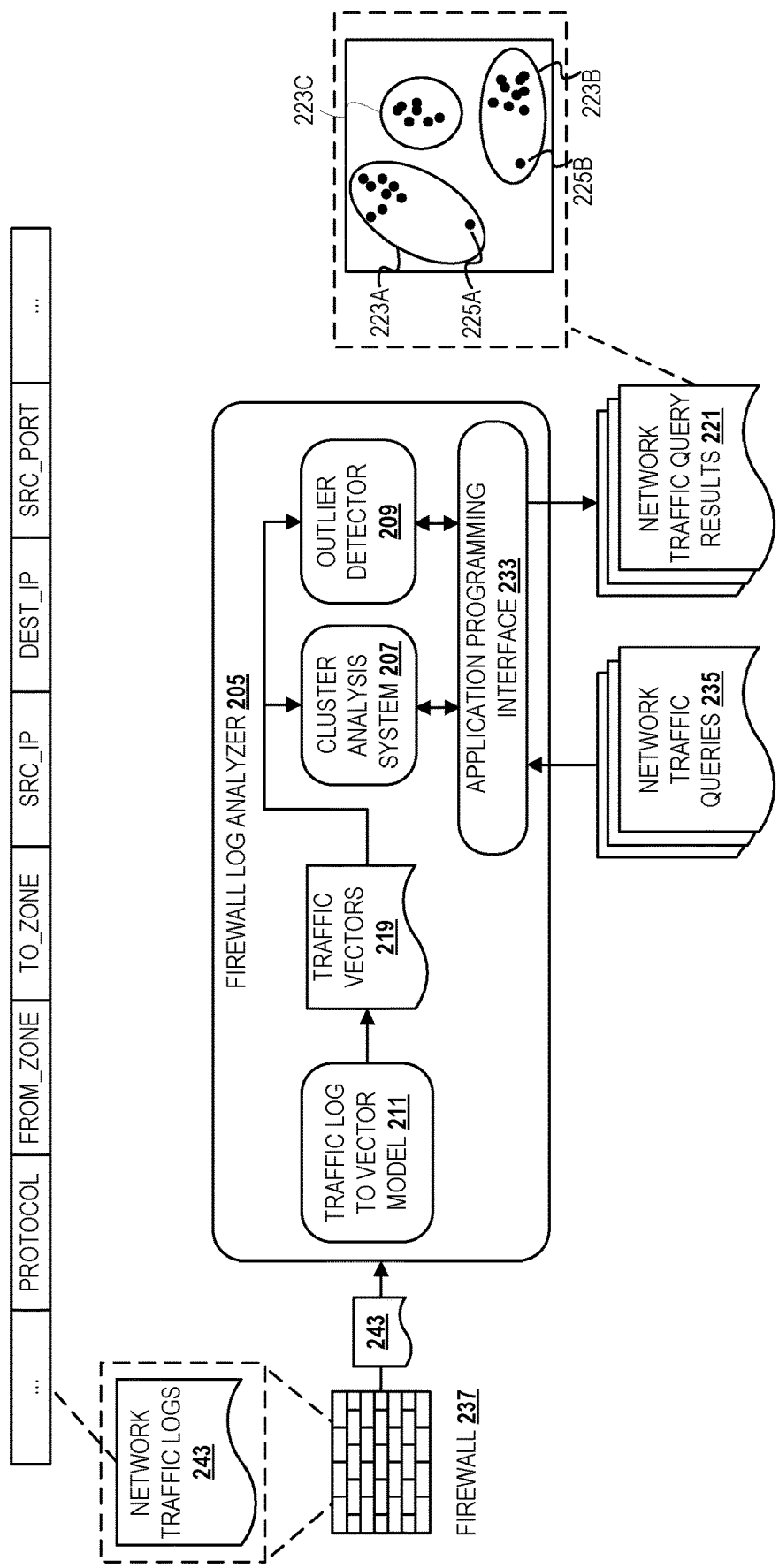
FIG. 2 depicts a conceptual diagram of analyzing network traffic detected by a firewall based on generating vector representations of traffic log data and performing cluster analysis.

FIG. 2 depicts a conceptual diagram of analyzing network traffic detected by a firewall based on generating vector representations of traffic log data and performing cluster analysis. A firewall 237 generates network traffic logs ("logs") 243 as similarly described in FIG. 1. Entries in the logs 243 which the firewall 237 generates based on detection and inspection of network traffic include values for each of a set of fields. Examples of fields of the logs 243 can include fields for an application associated with the session, a protocol, source and destination zones defined for interfaces of the firewall 237 (e.g., trusted or untrusted zones), source and destination IP addresses, and source and destination ports. Based on detection of network traffic, the firewall 237 determines data corresponding to each of the fields based on inspection of the network traffic, such as based on the packet headers, payload inspection, and/or application identification, and records the determined data in a log entry. A firewall log analyzer ("log analyzer") 205 obtains the logs 243 to generate vector representations of entries of the logs 243.

Once the log analyzer 205 obtains the logs 243 from the firewall, the log analyzer 205 trains and utilizes a traffic log to vector model ("model") 211 to generate traffic vectors 219 based on the logs 243. The model 211 accepts the logs 243 as input. The log analyzer 205 may preprocess the logs 243 before passing the logs 243 to the model 211 as input. For instance, the log analyzer 205 may format the logs 243 into a table or other data structure such that each row of a table represents a traffic log entry and columns include values of a common field. The log analyzer 205 first utilizes the model 211 to determine a vector representation of each of the values recorded in the logs 243. As similar to implementations of word2vec, the log analyzer 205 determines the unique values of each of the fields of the logs 243 as well as pairs/combinations of the values for use as training data. The model 211 can comprise a neural network which the log analyzer 205 trains by utilizing the pairs/combinations of the unique values as context and target values. Once the neural network has been trained, the log analyzer 205 can determine a weight matrix of the trained neural network, where the weight matrix includes the vectors representing each of the unique values recorded in the logs 243.

The log analyzer 205 creates vectors representing each of the entries of the logs 243 based on the vector representations of each of the values recorded in the logs 243. The log analyzer 205 may process each entry of the logs 243 concurrently or in parallel, in batches, etc. for generating the corresponding vector representations. For each entry of the logs 243, the log analyzer 205 creates a corresponding vector representation based on determining the values included therein and combining the vectors which represent those individual values generated from training the model 211. For instance, the log analyzer 205 can determine a sum, average, or other combination or aggregation of each of the vectors which were created and determined to correspond to a traffic log entry to create a vector representing the entry. The traffic vectors 219 thus comprise vector representations of corresponding entries of the logs 243. As an illustrative example, if a traffic log entry indicated a source IP address of 10.10.10.1, a destination IP address of 218.8.104.58, and a port number of 8080, the log analyzer 205 would generate a traffic vector representing that entry based on combining the vectors which were created for each of the values of source address 10.10.10.1, destination address 218.8.104.58, and port 8080 based on training the model 211.

Network traffic recorded in the logs 243 can then be analyzed based on submission of network traffic queries ("queries") 235 to an API 233 exposed by the log analyzer 205. The queries 235 may include requests to perform cluster analysis of the traffic vectors 219. Such queries may be handled by a cluster analysis system 207 which groups the traffic vectors 219 into clusters. The cluster analysis system 207 can implement a cluster analysis algorithm such as k-means clustering for assigning the traffic vectors 219 to clusters. In this example, the cluster analysis system 207 assigns each of the traffic vectors 219 to one of three clusters—a cluster 223A, a cluster 223B, and a cluster 223C. Clusters may represent groups of generally similar network traffic, such as based on the network traffic corresponding to similar applications. The resulting clusters 223A-C of vectors and corresponding characteristics of network traffic corresponding to each cluster can be returned in network traffic query results ("results") 221. Alternatively, or in addition, the queries 235 may also include requests to identify any outliers among the traffic vectors 219 which represent potentially anomalous traffic. Such queries can be passed to an outlier detector 209 which analyzes the traffic vectors 219, such as through analysis of the clusters among the traffic vectors 219 generated by the cluster analysis system 207. The outlier detector 209 may evaluate traffic vectors of the clusters 223A-C based on an outlier detection criterion which is a threshold corresponding to a distance between a vector assigned to a cluster and the centroid of the cluster. The outlier detector 209 can then determine whether any vectors assigned to a cluster have a distance from the cluster centroid which exceeds the threshold and, if so, determine that the vectors should be considered outliers. In this example, the outlier detector 209 detects an outlier 225A in the cluster 223A and an outlier 225B in the cluster 223B. The traffic vectors represented by the outliers 225A, 225B may correspond to anomalous network traffic as a result of exhibiting a relatively low degree of similarity to any of the other traffic vectors in their respective clusters. The outliers 225A, 225B can then be returned in the results 221. Generating the traffic vectors 219 thus facilitates identification of traffic patterns and outliers among network traffic which the firewall 237 detected.

Figure 3:
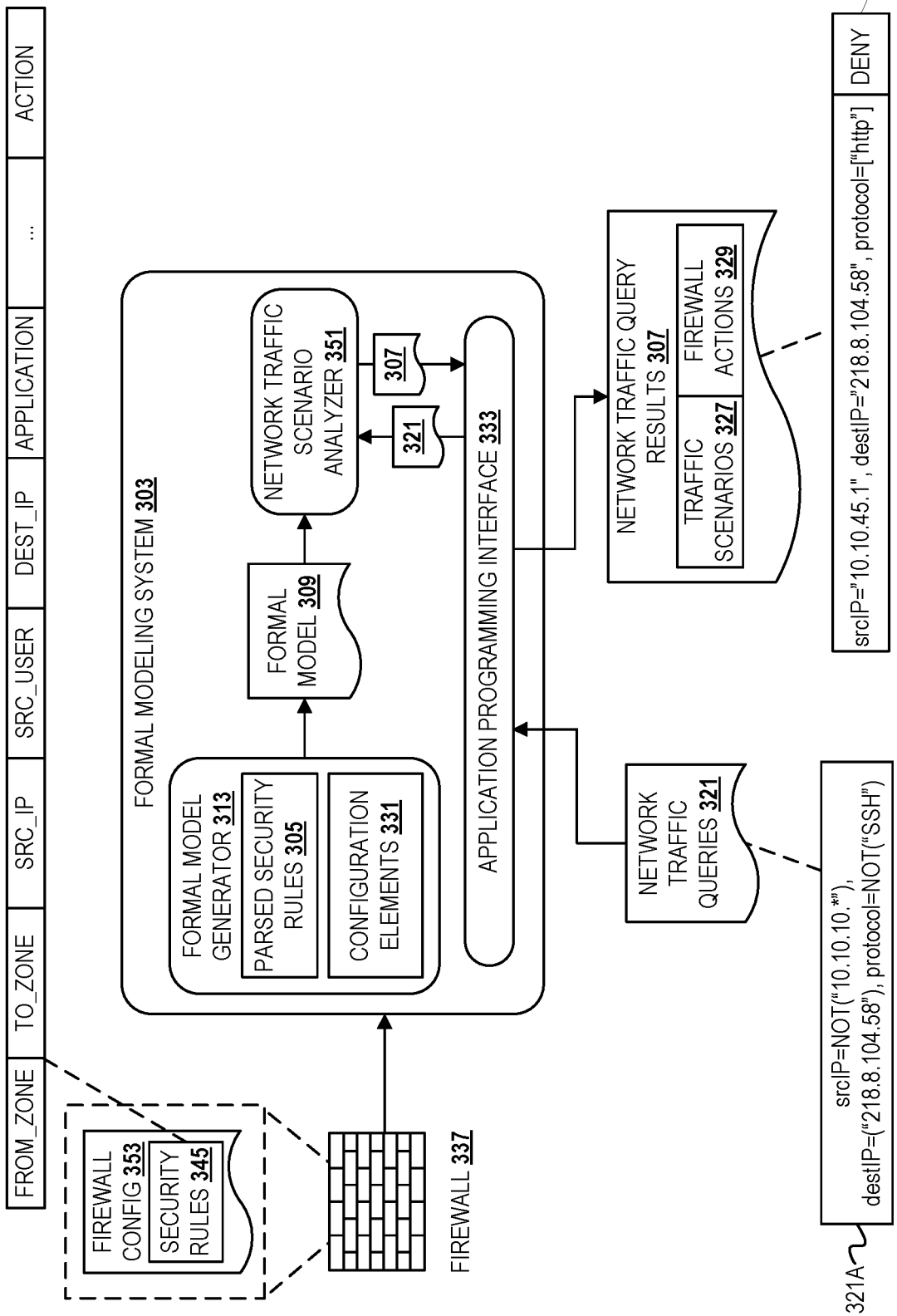
FIG. 3 depicts a conceptual diagram of generating and using a formal model which represents behavior of a firewall.

FIG. 3 depicts a conceptual diagram of generating and using a formal model which represents behavior of a firewall. FIG. 3 depicts a firewall 337 having a firewall configuration 353 comprising one or more files defining the specification/configuration of the firewall 337 and specifies security rules 345. The firewall configuration 353 captures the logical components of which the firewall 337 specification is comprised, such as network interfaces, zones, addresses, address groups, applications, application groups, address translation rules, security profiles, routing tables, and the security rules 345. The security rules 345 designate network traffic characteristics, which may be represented as field-value pairs, and an action which the firewall 337 should take on network traffic which matches the rule. Examples of network traffic characteristics which may be designated by the security rules 345 include to/from zones, source/destination IP addresses, source/destination port numbers, and application associated with a session, or other logical components specified in the firewall configuration 353. A formal modeling system ("modeling system") 303 obtains indications of the firewall configuration 353 which includes the security rules 345. Once the security rules 345 have been obtained, a formal model generator ("model generator") 313 of the modeling system 303 generates a formal model 309. The formal model 309 is a mathematical description of components specified in the firewall configuration 353 and their relationships, which may be stated with mathematical formulae (e.g., equations), such that the formal model 309 represents behavior of the firewall 337.

To generate the formal model 309 from the firewall configuration 353, the model generator 313 converts the network elements/logical entities indicated as configuration elements 331 and their relationships specified at least partly by the security rules 345 to formulas. The logical entities/network elements indicated as configuration elements 331, such as source/destination IP address, destination IP address, applications, actions, etc. are considered independent variables. Some of these variables can take values from a discrete set (i.e., possible values) which is inferred from the firewall configuration 353. Thus, the formal model 309 comprises a set of formulas which represent the relationships between these variables as described in the firewall configuration 353 and security rules 345. The model generator 313 generates the formulas based on parsing the security rules 345 to generate parsed security rules 305 and determines configuration elements 331 specified in the firewall configuration 353. The parsed security rules 305 can comprise indications of each security rule, the corresponding field-value pairs specified by the rule, and the action to take on network traffic which matches to the rule. The model generator 313 then converts each of the parsed security rules 305 to a formula, where the formal model 309 comprises the formula representations of the logical components defined in the firewall configuration 353 and the security rules 345. The formulas generated from conversion of the parsed security rules 305 may each be of a form which includes an antecedent and a consequent, where the antecedent corresponds to the network traffic characteristics specified in the security rule and the consequent corresponds to the action the firewall 337 is to take for network traffic matching to the characteristics designated in the antecedent. The formulas generated from the configuration elements 331 can include domains of values for each of the logical entities and network elements identified from the firewall configuration 353, such as a set of address group values, a set of zones, a set of known application identities, etc.

As an example, a first of the security rules 345 in the firewall configuration 353 may read as, "Allow traffic iff (from zone equals 'trusted'), (application is 'any'), (to zone equals 'internal')." The model generator 313 parses this rule and converts the rule to a formula of the form [antecedent (expression) implies (→) consequent (expression)]. The converted formula of this form and sets of values for the associated ones of the configuration elements 331 are depicted below with Equations 1-4.

$$\text{From\_Zone} \in [\text{'trusted'}] \wedge \text{To\_Zone} \in [\text{'internal'}] \rightarrow \text{Action} \in [1] \quad (1)$$

$$\text{From\_Zone} \in [\text{'trust'}, \text{'untruse'}, \text{'internal'}] \quad (2)$$

$$\text{To\_Zone} \in [\text{'trust'}, \text{'untrust'}, \text{'internal'}] \quad (3)$$

$$\text{Action} \in [0,1] \quad (4)$$

Taken together, these formulas designate that the firewall 337 is to allow traffic sent from a trusted zone to an internal zone, where values of the from zone and to zone fields include trust, untrust, and internal and values of the action field include block and allow (i.e., 0 and 1). The model generator 313 thus builds the formal model 309 from formulas such as those depicted in Equations 1-4.

The formal model 309 can then be utilized for analyzing scenarios of network traffic which could potentially or hypothetically be detected by the firewall 337 based on submission of network traffic queries ("queries") 321 to the modeling system 303. A network traffic scenario analyzer ("analyzer") 351 accepts the formal model 309 as an input (e.g., based on loading the formulas of which the formal model 309 is comprised). The analyzer 351 may be a solver for satisfiability modulo theories (SMT) which searches for a solution to input queries, or whether an input representing a network traffic scenario is satisfiable. The modeling system 303 thus translates the queries 321 into an input formula of the same form depicted above (i.e., with the antecedent and consequent form) upon submission for compatibility with the analyzer 351. The queries can be submitted to the modeling system 303 via an API 333 or query interface exposed by the modeling system 303 and are then also passed as input to the analyzer 351. The queries 321 may indicate characteristics of network traffic that are determined based at least partly on results of firewall log analysis which indicate groups of similar network traffic and outliers as described above. An example query 321A corresponds to a scenario in which network traffic has a source IP address that is not 10.10.10.*, a destination IP address of 218.8.104.58, and a protocol that is not Secure Shell Protocol (SSH). Inputting the query 321A to the analyzer 351 thus yields an output indicating whether network traffic having these characteristics, or non-SSH traffic having a source IP address that does not match to 10.10.10.* and a destination IP address of 218.8.104.58, could possibly be detected by the firewall 337 and, if so, would be allowed or blocked by the firewall 337.

The analyzer 351 searches for solutions to the network traffic scenarios provided as input following their translation to a compatible format or representation (e.g., a first-order or propositional logic representation). For each of the network traffic scenarios specified by the queries 321 which is translated and input to the analyzer 351 with the formal model 309, if the solution exists, the analyzer 351 indicates the solution. The solution may indicate the firewall action and one or more values of one or more traffic log fields which would be logged for network traffic according to the scenario. Otherwise, the analyzer 351 returns an indication that the formula is unsatisfiable, or no solution exists. Unsatisfiable formulas may thus correspond to network traffic that could not be detected by the firewall 337 for the network which it secures, such as based on having impossible combinations of network traffic properties. Results 307 generated by the analyzer 351 and provided as output of the modeling system 303 indicate network traffic scenarios 317 and firewall actions 329. The network traffic scenarios 317 may be those which were provided as input via the queries 321 and indicate one or more characteristics of network traffic. The firewall actions 329 indicate, for each corresponding one of the network traffic scenarios 327, whether the respective input formula was satisfiable (i.e., if such network traffic could possibly be observed), and, if so, an action which the firewall 337 would take if the scenario were detected based on the security rules 345. An example result 307A which corresponds to output generated based on the query 321A includes an indication of network traffic having a source IP address of 10.10.45.1, a destination IP address of 218.8.104.58, a protocol of HTTP, and a corresponding firewall action of "deny." The result 307A is a solution generated by the analyzer 351 which indicates that the query 321A is satisfiable and that network traffic having the given characteristics would be denied/blocked by the firewall 337 according to the security rules 345. Thus, even though the firewall 337 may not have detected network traffic having these characteristics, utilizing the formal model 309 for representing firewall behavior allows for collecting additional information about behavior of the firewall 337.

Figure 4:
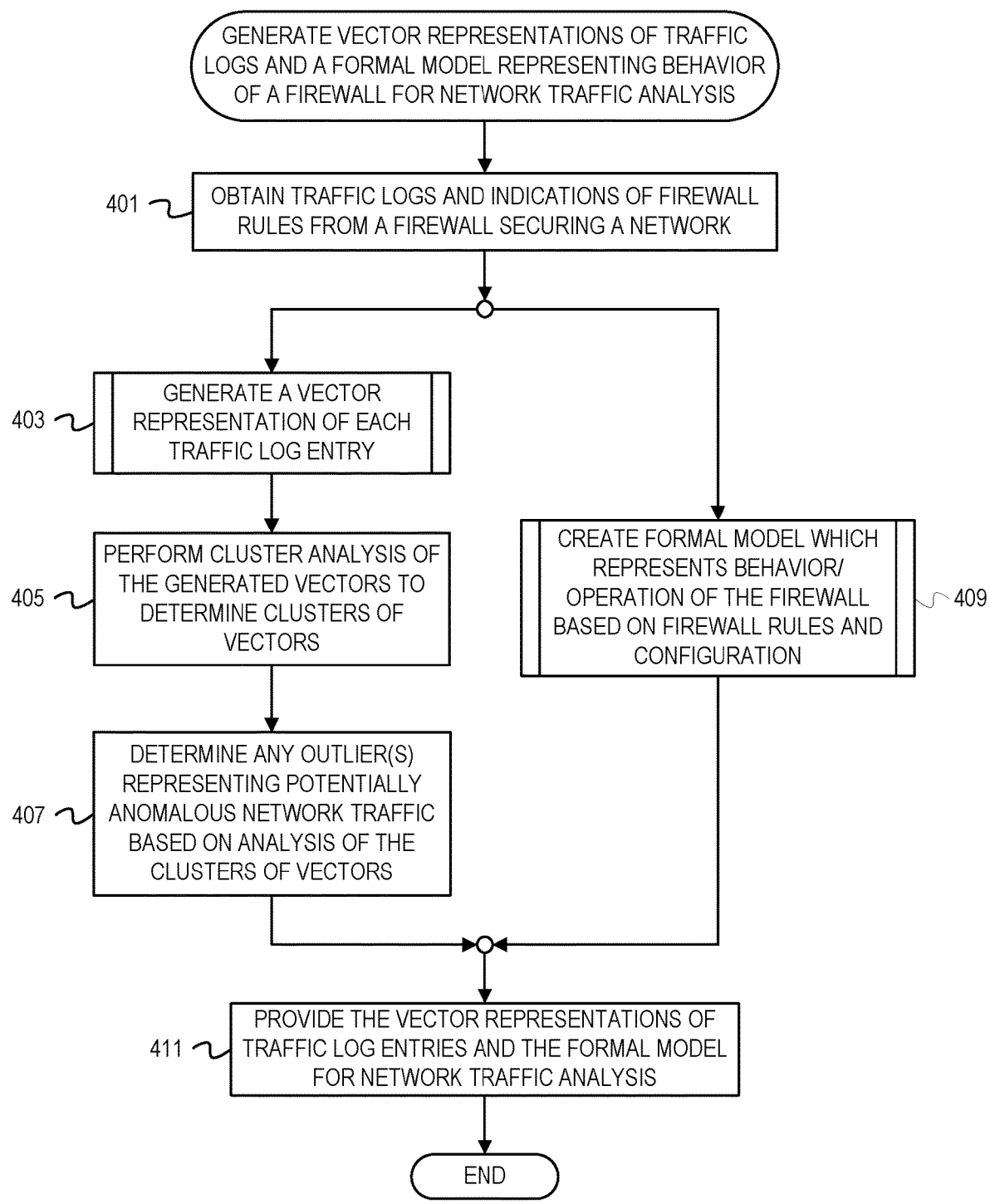
FIG. 4 is a flowchart of example operations for generating vector representations of traffic logs and a formal model representing behavior of a firewall for network traffic analysis.
Figure 5:
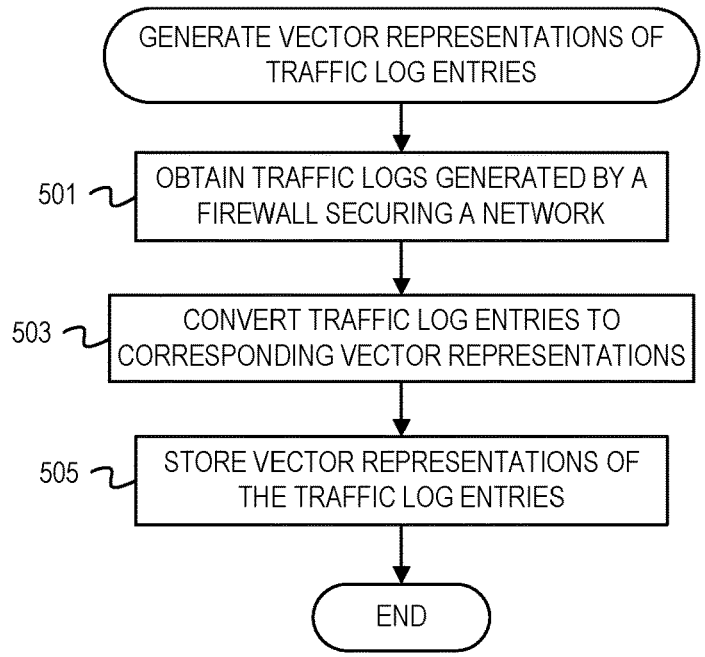
FIG. 5 is a flowchart of example operations for generating vector representations of traffic log entries.
Figure 6:
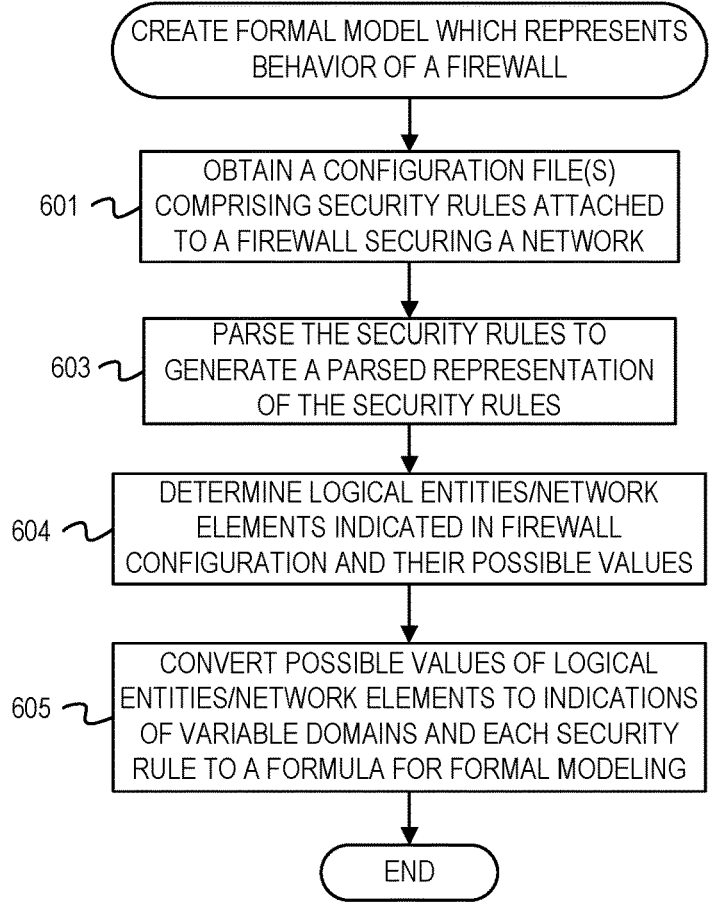
FIG. 6 is a flowchart of example operations for creating a formal model which represents behavior of a firewall.

FIGS. 4-6 depict flowcharts of example operations for combined machine learning and formal techniques for network traffic analysis. The example operations are described with reference to a network traffic analysis system, firewall log analyzer, or a formal modeling system (hereinafter the "system," "log analyzer," and "modeling system," respectively) for consistency with the earlier figures. The example operations assume that a firewall secures a network and generates traffic logs based on detection of network traffic. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 4 is a flowchart of example operations for generating vector representations of traffic logs and a formal model representing behavior of a firewall for network traffic analysis. The example operations are described with reference to the system. The operations performed at blocks 403-407 and block 409 are depicted as being performed by the system in parallel or concurrently; however, in other implementations, the system may perform these operations differently (e.g., partially in parallel or concurrently, sequentially, etc.). Additionally, while FIG. 4 depicts the cluster analysis and outlier determination as being performed after generation of the vector representations of the traffic log entries, in other implementations, the system may perform the cluster analysis and/or outlier determination based on subsequent submission of one or more queries for analysis of the vectors.

At block 401, the system obtains traffic logs and indications of firewall rules from a firewall securing a network. The traffic logs are those generated by the firewall based on detection of network traffic. The traffic logs indicate a plurality of characteristics of detected network traffic, such as source IP address, destination IP address, protocol, to/from zones (e.g., trusted or untrusted), etc. The firewall may be configurable to periodically upload traffic logs to the system, such as according to a schedule. The system can obtain traffic logs generated during a configurable time interval, such as the traffic logs from the last 90 days, last month, etc. The system may obtain the indications of firewall rules based on obtaining a configuration file(s) maintained by the firewall which indicates a specification/configuration of the firewall, including the firewall rules.

At block 403, the system generates a vector representation of each traffic log entry. The system inputs the traffic log entries into a model which utilizes machine learning techniques similar to a model used for implementations of word2vec (e.g., a neural network) to generate vector representations of traffic log data. The system may first preprocess the traffic log entries prior to input to the model, such as by converting the traffic logs into a tabular representation and/or removing field-value pairs which the system has been configured to disregard for vector generation. The model learns contexts of each of the values of each of the fields of the traffic log and creates individual vector representations of each of the values. The "context" of a value in a traffic log entry is provided by the other values appearing in the traffic log entry and can be considered to be analogous to the context of a word which is provided by the sentence in which the word appears as with implementations of word2vec. Based on the created vector representations of the recorded values, the model can then create a vector which represents an entry in the traffic log by combining the created vectors which correspond to each of the values recorded in the entry. Generation of vector representations of traffic log entries is described in further detail in FIG. 5.

At block 405, the system performs a cluster analysis of the generated vectors to determine clusters among the traffic log vectors. The system may perform cluster analysis of the generated vectors as part of the initial vector generation or based on submission of a query requesting that cluster analysis be performed to group the generated vectors into clusters of generally similar traffic. The system uses a clustering algorithm such as k-means clustering or another unsupervised learning technique to assign the vectors to one or more clusters. Vectors which are members of the same cluster may represent network traffic patterns or generally similar network traffic. Examples of similar network traffic include network traffic having the same or similar source and/or destination IP addresses and network traffic associated with similar applications (e.g., based on application types or categories).

At block 407, the system determines any outliers representing potentially anomalous network traffic among the generated vectors based on analysis of the clusters of vectors. The system may determine outliers among the generated vectors as part of initial vector generation or based on submission of a query comprising a request that outlier vectors representing potentially anomalous network traffic be determined. The system may determine whether any of the generated vectors and/or clusters to which one or more vectors are assigned satisfy one or more criteria for outlier detection. For instance, the criteria may indicate a first threshold corresponding to a distance of a vector from a centroid of its respective cluster. Based on computing distances between vectors and the centroids of their respective clusters, the system can determine that a vector having a distance from its respective centroid which exceeds the first threshold is an outlier. As another example, the criteria may indicate a second threshold corresponding to a number of vectors assigned to a cluster. Based on determining counts of vectors assigned to the clusters, the system can determine that a vector(s) belonging to a cluster having a membership count which is below the second threshold is an outlier.

At block 409, the system creates a formal model which represents behavior of the firewall based on the firewall rules and configuration. The system generates the model based on parsing the firewall rules and configuration file(s) in which the rules were included and constructing a set of formulas representing the firewall behavior. The set of formulas can indicate sets of logical entities defined by the firewall configuration, such as IP addresses which form a group and a set of the zones which have been defined for interfaces of the firewall. The set of formulas also indicates formula representations of the firewall rules, where each formula has an antecedent and a consequent. The system builds the formal model from the set of formulas so that the formal model comprises the formula representations of the firewall rules and the logical entities specified in the firewall configuration. The formal model allows for proposed/hypothetical network traffic scenarios defined with first order or propositional logic to be evaluated with an SMT solver to determine whether the network traffic scenarios could be observed and, if so, whether network traffic according to the scenario would be allowed or blocked by the firewall. Creation of formal model which represents behavior of the firewall is described in further detail in FIG. 6.

At block 411, the system provides the vector representations of the traffic log entries and the formal model for network traffic analysis. The system provides a query engine by which queries can be submitted for performing analysis of the vector representations of actual network traffic and/or for performing analysis of hypothetical network traffic with the formal model.

FIG. 5 is a flowchart of example operations for generating vector representations of traffic log entries. The example operations are described with reference to the log analyzer.

At block 501, the log analyzer obtains traffic logs generated by a firewall securing a network. The traffic logs can include data/metadata about network traffic detected by the firewall, such as traffic data/metadata determined based on packet headers, packet inspection, and/or application identification. The firewall may have been configured to periodically upload the traffic logs to the log analyzer. In other examples, the log analyzer can download the traffic logs from the firewall. The log analyzer may obtain traffic logs generated over the course of a designated time period, such as the traffic logs for the last 30 days, last 90 days, etc. The log analyzer may preprocess the traffic logs to reformat the traffic logs, such as by generating a table or matrix representing the traffic logs, where each row corresponds to an entry and each column corresponds to a traffic log field.

At block 503, the log analyzer converts the traffic log entries to corresponding vector representations. The log analyzer first determines the values recorded for each of the fields of the traffic log (e.g., values of source/destination IP addresses, source/destination zones, protocols, applications, etc.) and deduplicates the determined values. The log analyzer may then determine pairs of the deduplicated values within a window of a given size, where the window size refers to a number of consecutive traffic log values, and generate one-hot vectors representing the values and pairs thereof. Similar to implementations of word2vec, the log analyzer can initialize and train a neural network using the pairs of values as context values and target values for learning contexts in which each of the values appears in logged network traffic. Once the neural network has been trained, the log analyzer determines the resulting vector representations of each of the values recorded in the traffic log based on extracting the weight matrix of the hidden layer. As is also similar to implementations of word2vec, this weight matrix will comprise the vectors representing each of the values which were identified from the traffic log, where the vector represented by row n of the weight matrix corresponds to the value recorded in the traffic log having a one-hot vector with a value of one in column n. For each entry of the traffic log, the log analyzer aggregates the individual vectors representing the values recorded in the entry to create a single vector representing the traffic log entry and therefore also representing the detected network traffic for the corresponding session. For instance, the log analyzer may determine an average or sum of the vectors to create the single vector representing the entry, where the order of the values is maintained as they appear in the traffic log entry during vector computation.

At block 505, the log analyzer stores the vector representations of the traffic log entries. Each of the vector representations can be stored in association with an identifier or index which can be used to identify the corresponding entry of the traffic log. The log analyzer may store the vector representations in a database or repository which can be queried during subsequent analysis of the traffic log vectors. For instance, based on submission of a query indicating a request to plot the set of vectors, the log analyzer may implement dimensionality reduction to generate two- or three-dimensional representations of the vectors, such as through feature selection, principal component analysis, etc., and return a result comprising a plot by which the vectors may be visualized in a lower-dimensional vector space. As another example, based on submission of a query indicating a request that a cluster analysis of the vectors be performed, the log analyzer may perform cluster analysis (e.g., through k-means clustering) to group the vectors into clusters.

FIG. 6 is a flowchart of example operations for creating a formal model which represents behavior of a firewall. The example operations are described with reference to the modeling system.

At block 601, the modeling system obtains a configuration file(s) comprising security rules attached to a firewall securing a network. The configuration file(s) specify configuration of the firewall, including logical entities of the network defined for the firewall (e.g., address groups, zones defined for interfaces, etc.). The configuration file(s) also comprise the security rules. The security rules indicate criteria for network traffic and corresponding actions to be taken on detected network traffic which satisfy the criteria. The modeling system may obtain the configuration file(s) based on the firewall uploading the configuration file(s) or by downloading the configuration file(s) from the firewall or via an administrator of the network which manages firewall deployments.

At block 603, the modeling system parses the security rules to generate a parsed representation of the rules. The modeling system can parse the configuration file(s) or a portion thereof to make accessible the security rules defined in the configuration. Each of the rules enforced by the firewall and indicated in the configuration file can specify one or more criteria network and an action which the firewall should take on detected network traffic which matches to the rule (i.e., satisfies the criteria). Examples of logical components and network elements which may be referenced in the criteria include network interfaces corresponding to zones, applications (e.g., in terms of application identities and/or protocols used), network addresses, and network address groups. Parsing the rules may be based on identifying a delimiter which separates the rules. Parsing an individual rule to further determine the one or more of the criteria and corresponding logical entities/network elements specified therein may be based on identifying keywords or identifiers in the rule which correspond to the entities/components, where the keywords or identifiers may also be indicated in the configuration file(s) of the firewall.

At block 604, the modeling system determines the logical entities and network elements indicated in the firewall configuration and their possible values. The modeling system can determine the indications of logical entities and network elements from the configuration file(s) of the firewall based on identifying keywords or identifiers from the configuration file which indicate configuration elements for the network and firewall. Identification of the logical entities/components and their values may be performed as part of parsing the configuration file(s) and security rules. Values of the logical components/entities may be inferred from the parsed configuration.

At block 605, the modeling system converts possible values of the logical entities and network elements to indications of variable domains and each security rule to a formula for formal modeling. The modeling system builds a formal model of the firewall behavior which comprises formula representations of the security rules and domains of variables corresponding to the logical entities/network elements identified from the configuration. To build the model, the modeling system converts each of the security rules to a corresponding logical representation which comprises an antecedent and a consequent. The antecedent corresponds to the criteria for network traffic indicated in the security rule. The consequent corresponds to the action which the firewall would take on network traffic satisfying the criteria indicated in the antecedent. The resulting logical representation of the security rules can be a first-order or propositional logic representation. To convert syntax of a security rule to a formula representation, the modeling system can map syntax determined from the parsed representation of the security rules to a corresponding formula element (e.g., a symbol/syntactic element of a logical formula). For determining sets of values of the logical entities of network elements, the modeling system creates a set from the values inferred from the parsed configuration which indicates the set of values which the logical entities and network elements indicated in a formula may take. The formulas also are generated to reflect the precedence among the order of security rules specified by the firewall configuration. Thus, precedence will be maintained in the formula representation of the security rules such that the formulas can be used to correctly model firewall behavior and operation.

As an example, consider a security rule indicated in the parsed configuration as follows:
Rule_Name: SRI
From_Zone: Trusted
Application: Any
To_Zone: Internal
Action: Allow The modeling system determines that this security rule indicates the independent variables "from_zone," "application," "to_zone," and "action," for which the possible sets of values are also inferred from the parsed configuration. The modeling system also determines that the values of these variables given for this rule are "trusted," "any," "internal," and "allow," respectively. The modeling system may be configured to treat the independent variable indicating the firewall action as a consequent and other logical entities/network elements and combinations thereof as antecedents for creating a formula representation, where combinations of values are converted to a conjunction and alternatives are converted to a disjunction. The modeling system may also be configured to omit independent variables having a value of "any" from the formula. Thus, from parsing this security rule, determining the combinations/alternatives of logical entity/network element variables and their values which form the antecedent, and determining the action taken by the firewall which forms the consequent, the modeling system converts these elements of the rule to a formula representation that is depicted below with Equation 5:

$$\text{From\_Zone} \in [\text{'trusted'}] \wedge \text{To\_Zone} \in [\text{'internal'}] \rightarrow \text{Action} \in [1] \quad (5)$$

Figure 7:
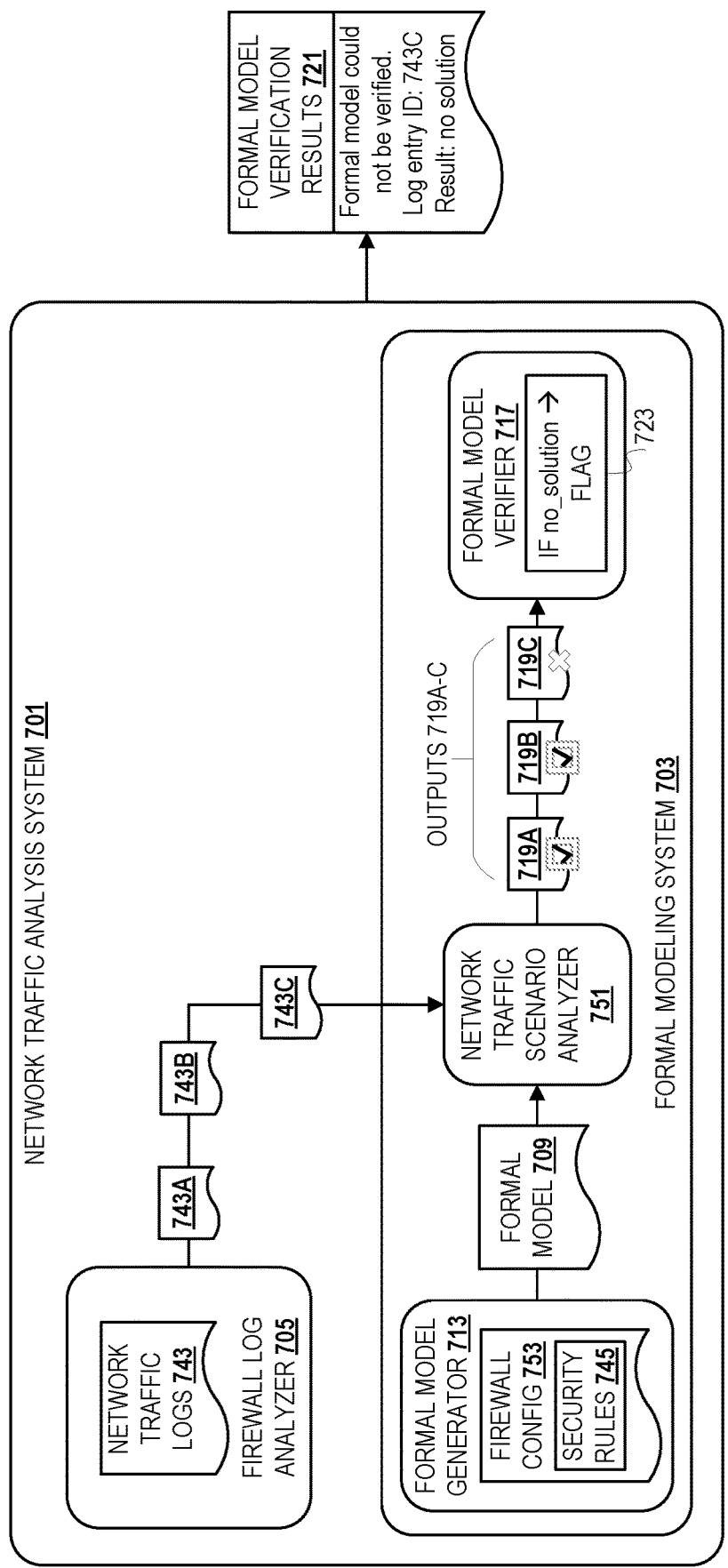
FIG. 7 depicts a conceptual diagram of using samples of logged network traffic to verify a formal model generated from a firewall configuration comprising security rules.

FIG. 7 depicts a conceptual diagram of using samples of logged network traffic to verify a formal model generated from a firewall configuration comprising security rules. A network traffic analysis system 701 comprises a firewall log analyzer ("log analyzer") 705 and formal modeling system 703 as described above. FIG. 7 depicts the log analyzer 705 after the log analyzer 705 has obtained network traffic logs ("logs") 743 generated by a firewall. FIG. 7 also depicts a formal model 709 generated based on a formal model generator 713 parsing a firewall configuration 753 and security rules 745 which have been obtained to generate corresponding formula representations (e.g., the security rules 745 and logical entities defined in the firewall configuration 753 represented with first-order or propositional logic). The formal modeling system 703 also includes a formal model verifier ("verifier") 717. Once the formal model 709 has been generated, the verifier 717 can determine whether the formal model 709 is an accurate representation of the firewall configuration 753 and security rules 745 based on using logical representations of detected network traffic recorded in the logs 743 and the formal model 709 as inputs to a network traffic scenario analyzer ("analyzer") 751. The log analyzer 705 which generates vector representations of obtained logs 743 thus also assists in generation and verification of the formal model 709 to determine if the formal model 709 is producing expected behavior when provided for analysis by the analyzer 751.

The log analyzer 705 provides a fixed number of entries of the logs 743 pertaining to each of the security rules 745 which the log analyzer 705 randomly selects from the logs 743 to create "witness properties." Witness properties check for existence of specified traffic scenarios against the formal model 709. On success, results indicating an action to be taken on network traffic specified by the scenario are generated and output by the analyzer 751, whereas failures are indicative of an over constrained model and that an issue has occurred in building the formal model 709. This is because the inputs to the analyzer 751 obtained from the logs 743 are samples of actual network traffic known to be possible for the network secured by the firewall. Thus, if the analyzer 751 determines that the corresponding traffic scenario is not possible (i.e., a solution cannot be found for the input), it can be determined that the formal model 709 is contributing to erroneous behavior.

The log analyzer 705 can select the subset of the logs 743 which should be provided for input to the analyzer 751 along with the formal model 709 based on selecting a set of logs which covers each of the security rules 745 applied to the detected network traffic; that is, the set of security rules triggered by the network traffic corresponding to the selected logs correspond to the security rules 745 from which the formal model 709 was built to ensure the most comprehensive evaluation of the formal model 709. Each of the entries of the logs 743 can include an indication of which of the security rules 745 was applied to the logged network traffic. The log analyzer 705 thus selects a minimum set of the entries of the logs 743 which covers each of the security rules 745 which was applied to the network traffic recorded in the logs 743 based on the indications of applied security rules. As an example, if the logs 743 comprise 100 entries which indicate a total of 50 different security rules, the log analyzer 705 can select 50 of the log entries such that each of the 50 rules are represented in the inputs for formal model verification.

In this example, traffic scenarios specified by a log entry 743A, a log entry 743B, and a log entry 743C are provided as input to the analyzer 751 with the formal model 709. The log entries 743A-C may be associated with a label, tag, or other metadata indicating an identifier of the log entry. As described above, the analyzer 751 can first convert the log entries 743A-C provided as input to a corresponding first-order or propositional logic representation for solving with an SMT solver. The analyzer 751 generates an output 719A, an output 719B, and an output 719C based on each of the inputs. If the formal model 709 properly models firewall behavior, each of the outputs 719A-C should indicate a solution which the analyzer 751 found or that the input scenario is satisfiable (i.e., the scenario could be observed for the network).

The verifier 717 obtains the outputs 719A-C and determines whether any of the outputs 719A-C indicate an incorrect verdict, or a verdict that the network traffic scenario represented by the corresponding input is not satisfiable (i.e., could not be observed for the network) and a solution could not be found. In this example, while the outputs 719A, 719B include a verdict that the input scenarios are satisfiable and a solution could be found, the output 719C includes a verdict that the input scenario is not satisfiable and there is no solution. The verifier 717 maintains one or more criteria 723 for verification of a formal model. In this example, the criteria 723 indicate that if an output from the analyzer 751 indicates no solution or that an input traffic scenario was unsatisfiable, the output should be flagged and the formal model 709 should not be verified as producing correct results. The verifier 717 determines that the output 719C satisfies the criteria 723 and flags the output 719C for indication in results 721.

The verifier 717 generates and provides model verification results ("results") 713 which indicate whether the formal model 709 can be verified and, if not, indicates the outputs of the analyzer 751 which satisfied the criteria 723. In this example, the results 721 indicate that the formal model 709 could not be verified due to the entry of the logs 743 corresponding to the output 719C failing to yield a solution by the analyzer 751. The results 721 may also indicate a corresponding one of the security rules 745 pertaining to the log entry 743C. The results 721 can be evaluated for subsequent evaluation and correction of the formal model 709 and may be used to troubleshoot the issues with generation of the formal model 709.

Figure 8:
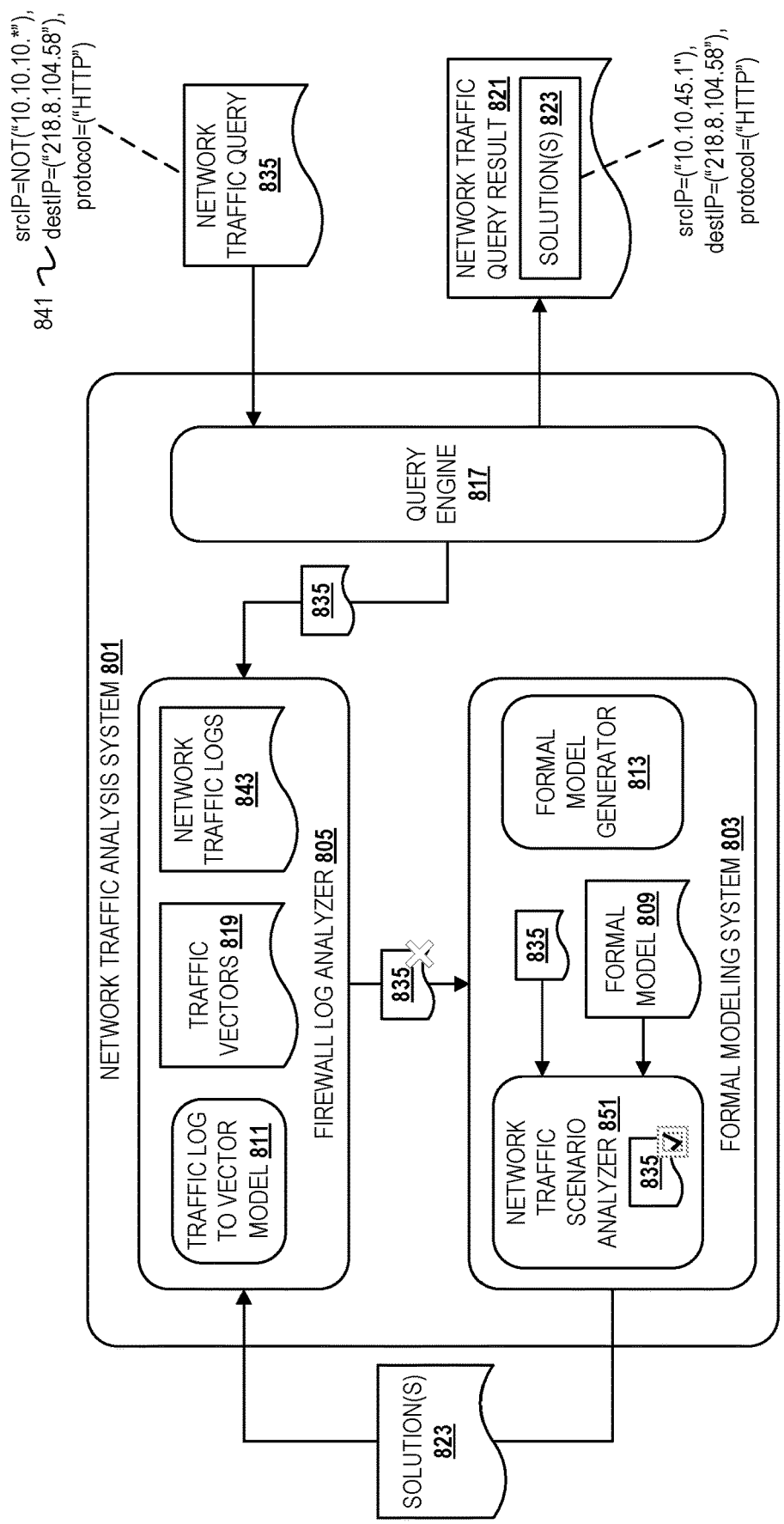
FIG. 8 depicts a conceptual diagram of generating new samples of network traffic used for training a vector generation model.

FIG. 8 depicts a conceptual diagram of generating new samples of network traffic used for training a vector generation model. FIG. 8 depicts a network traffic analysis system 801 comprising a firewall log analyzer ("log analyzer") 805, a formal modeling system 803, and a query engine 817 as described above. The log analyzer 805 has initially trained a traffic log to vector model ("811") using logs 843 generated by a firewall based on detection of network traffic. Thus, the model 811 has been trained with training data corresponding to actual, detected network traffic for generation of traffic vectors 819. A formal model generator 813 has also generated a formal model 809 based on a configuration and rules of a firewall.

A network traffic query ("query") 835 is submitted to the query engine 817. The query 835 comprises criteria 841 for network traffic, which in this example are criteria for network traffic which does not have a source IP address matching to 10.10.10.* and has a destination IP address of 218.8.104.58 and is HTTP traffic. Based on submission of the query 835, one or both of the log analyzer 805 and formal modeling system 803 can evaluate the query 835. The query engine 817 first passes the query 835 to the log analyzer 805 to determine whether network traffic satisfying the criteria 841 has been detected and has a corresponding vector representation(s) in the traffic vectors 819. The log analyzer 805 evaluates the traffic vectors 819 based on the criteria 841 to determine whether any network traffic previously detected by the firewall satisfies the criteria 841 based on one or more of the traffic vectors 819 indicating network traffic reflected in the logs 843 which satisfies the criteria 841. In this example, the log analyzer 805 determines that none of the traffic vectors 819 correspond to network traffic satisfying the query 835 and passes the query 835 to the formal modeling system 803.

The formal modeling system 803 obtains the query 835 and, as described above, can first convert the criteria 841 of the query 835 to a first-order or propositional logic representation. The formal modelling system 803 then can submit the converted representation of the criteria 841 and the query 835 to a network traffic scenario analyzer ("analyzer") 851. FIG. 8 depicts the query 835 as being submitted to the analyzer 851 for simplicity, though it should be understood that the converted representation of the query 835 is submitted to the analyzer 851. The analyzer 851 can comprise an SMT solver which searches for solutions satisfying the criteria represented with first-order or propositional logic based on the formal model 809. In this example, the analyzer 815 outputs a solution 823 for the query 835 based on determining that the criteria are satisfiable in view of the behavior modeled by the formal model 809. The solution 823 comprises indications of one or more possible network traffic scenarios which satisfy the criteria 841 and could potentially be observed for a network being analyzed through detection by the firewall.

In addition to passing the solution 823 to the query engine 817 for presentation of a result 821 which indicates the solution 823, the formal modeling system 803 passes the solution 823 to the log analyzer 805. The log analyzer 805 then utilizes the indications of possible network traffic in the solution 823 as training data for incremental training of the model 811 because the network traffic was determined to be possible for the network despite not being observed. Results of analyzing network traffic queries indicating criteria for network traffic which are not satisfied by actual network traffic but could be satisfied by possible/potential network traffic based on the analyzer 851 finding a solution utilizing the formal model 809 thus augments the training data available for training the model 811 beyond the log data actually recorded in the logs 843 by the firewall.

Figure 9:
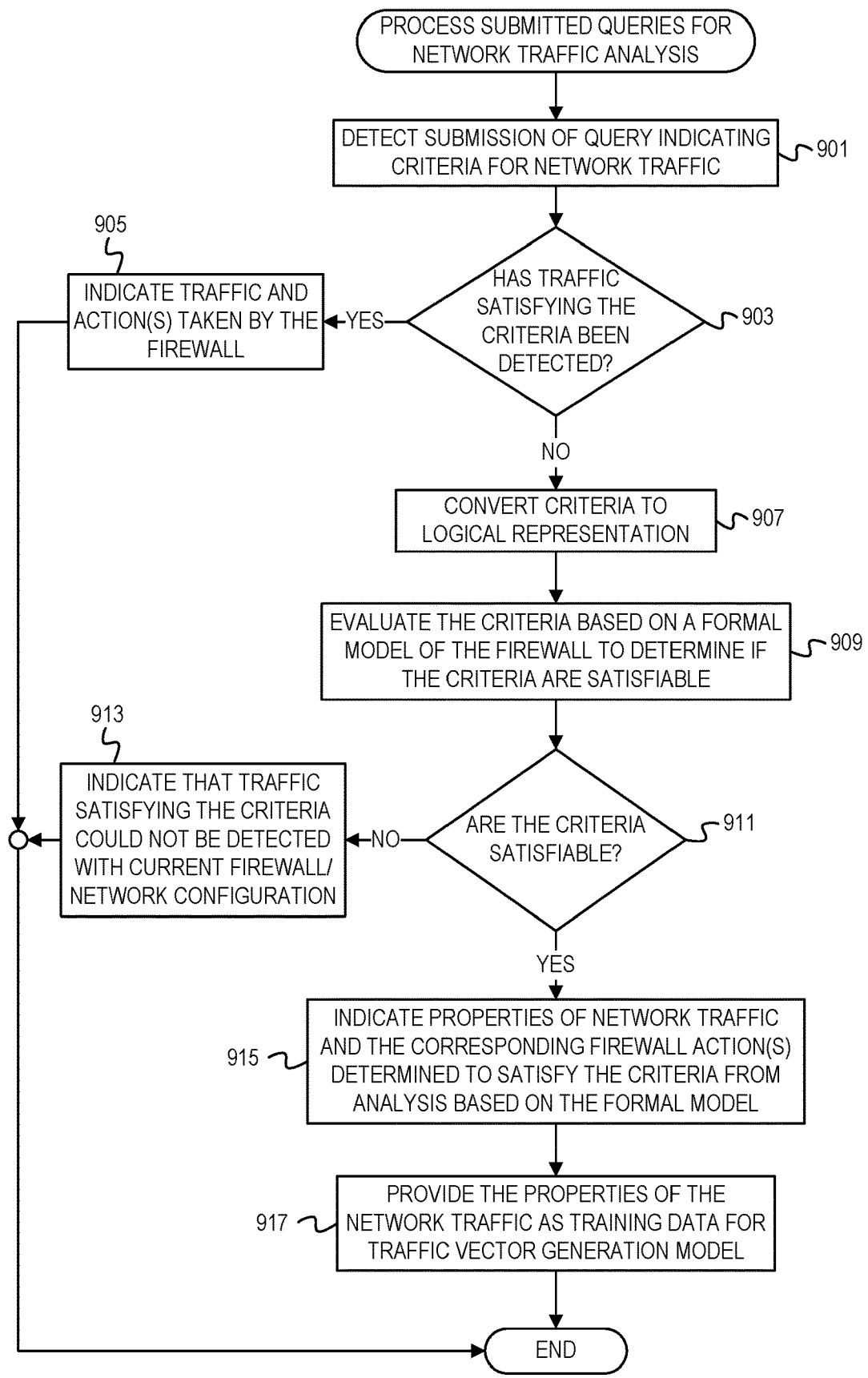
FIG. 9 is a flowchart of example operations for evaluating a submitted query comprising criteria for network traffic to determine whether actual or hypothetical network traffic for a network satisfies the query.

FIG. 9 is a flowchart of example operations for evaluating a submitted query comprising criteria for network traffic to determine whether actual or hypothetical network traffic for a network satisfies the query. The example operations are described with reference to the system having a query interface which unifies vector generation and formal models generated as described above.

At block 901, the system detects submission of a query indicating one or more criteria for network traffic. The criteria may be criteria for any characteristic of network traffic that may be determined by a firewall, such as source/destination IP addresses, source/destination ports, application associated with the session, protocol, etc. As an example, the query may be a query to check for HTTP traffic originating from an untrusted zone which can reach a server in an internal zone and having an IP address of 255.254.21.2, where the criteria may be represented as "protocol=HTTP, source zone=untrusted, destination zone=internal, destination address=255.254.21.2."

At block 903, the system determines if network traffic satisfying the criteria has been detected by the firewall. The system determines whether network traffic satisfying the criteria has previously been detected based on network traffic logs obtained from a firewall and/or traffic vectors comprising vector representations of entries of the logs which were already generated. The system may query or filter the traffic log entries and corresponding traffic vectors based on the criteria to determine if network traffic which satisfies the criteria can be identified among the log entries or traffic vectors. Multiple log entries and corresponding traffic vectors may indicate network traffic satisfying the criteria. If network traffic satisfying the criteria has been detected, operations continue at block 905. If network traffic satisfying the criteria has not been detected, operations continue at block 907.

At block 905, the system indicates the network traffic determined to satisfy the criteria and corresponding action(s) taken by the firewall on the network traffic. The system determines the action(s) taken by the firewall recorded in association with the indication of network traffic determined from filtering/querying traffic log entries and/or the traffic vectors indicating corresponding network traffic properties (e.g., the returned log entry(ies) and/or traffic vector(s)). If multiple logged instances of detected network traffic satisfied the criteria, the system can indicate each of the instances and corresponding actions taken by the firewall on the network traffic.

At block 907, the system converts the criteria to a logical representation. The system converts the criteria to a logical representation, such as a representation using first-order or propositional logic. The system converts the criteria to a logical representation as similarly described above in reference to converting a security rule to a logical representation. For instance, the one or more logical entities and network elements indicated in the criteria are converted to indications of the corresponding independent variables and their values and may be represented with set notation. The system converts combinations of independent variables and their values to conjunctions and converts alternatives provided for independent variables and their values (e.g., protocol=HTTP OR src_zone=untrusted) or alternatives provided for values of an independent variable (e.g., protocol=HTTP OR HTTPS) to disjunctions. "Not" statements indicated in the criteria are converted to negations. The resulting formula representation of the criteria is similar to an antecedent of a formula representation of a security rule.

At block 909, the system evaluates the criteria based on a formal model of the firewall to determine if the criteria are satisfiable. The criteria are satisfiable if network traffic represented by the query could possibly be detected by the firewall with the current firewall configuration and network configuration represented with the logical entities and network elements indicated in the firewall configuration. The formal model comprises a set of formulas (e.g., represented with first-order/propositional logic) generated from security rules of a firewall and logical entities/network elements indicated in the firewall specification and their possible values as described above. The system can determine if the criteria are satisfiable by invoking an SMT solver program, application, etc. and providing the formal model and the logical representation of the criteria as input. The SMT solver searches for a solution to the criteria based on the formulas of the formal model, where the solution is one or more properties of network traffic satisfying the criteria which could be detected by the firewall.

At block 911, the system determines if the criteria are satisfiable. The system can obtain an output from the SMT solver which indicates whether a solution to the logical representation of the query could be found. The criteria are not satisfiable if a solution cannot be found. If the criteria are not satisfiable, operations continue at block 913. If the criteria are satisfiable, operations continue at block 915.

At block 913, the system indicates that network traffic satisfying the criteria could not be detected with the current firewall/network configuration. The system returns an indication that the criteria are not satisfiable since no solution could be found based on the formal model as a result of the query. Network traffic satisfying the criteria may not be possible to detect for the network if the criteria indicated an impossible property or combination of properties of network traffic, such as one or more properties which are not permissible based on the current firewall and/or network configuration (e.g., a value of a zone which has not been defined for an interface).

At block 915, the system indicates one or more properties of network traffic and the corresponding action(s) which would be taken by the firewall which were determined to satisfy the criteria from the analysis based on the formal model. Multiple combinations of network traffic properties may have been determined to satisfy the criteria may be possible and determined from results of utilizing the SMT solver. The system returns the indication(s) of network traffic which satisfied the criteria and the corresponding action which the firewall would take on each indicated network traffic as a result of the query.

At block 917, the system provides the network traffic properties as training data to a model used for generation of traffic vectors as described above. Because network traffic satisfying the criteria was not detected by the firewall but could possibly be detected for the network, the indication of possible/hypothetical network traffic can be used to supplement training of the model during incremental training in some implementations. The network traffic properties indicated in the solution may be preprocessed prior to use as training data.

Variations

In some implementations, the system can analyze temporal evolution of vectors which represent the unique values identified from firewall logs. For instance, the system can store vectors created for the values of the traffic log in a repository which maintains historical data corresponding to vector representations of the values. As part of generating results of submitted queries indicating analysis of the generated vector representations of traffic log entries, the system may determine whether there have been any changes to a vector representing one or more of the values indicated in the results over a defined period of time (e.g., a month, six months, etc.). For example, the results may indicate a vector determined to correspond to outlier network traffic for which the vector representation of the associated source IP address has changed during the past three months. Changes to a vector representation of a value over time may be determined based on computing the cosine similarity between the current vector and the previously-computed vector and determining if the cosine similarity exceeds a threshold, which may be indicative of substantial changes in behavior in the network. Changes in vector representation of values over time can indicate changing behavior patterns in a network which should be reported with the associated results.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 403-407 and 409 can be performed at least partially in parallel or concurrently. Embodiments may not perform the cluster analysis and outlier determination depicted in blocks 405 and 407 as part of the initial vector and formal model generation. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 10:
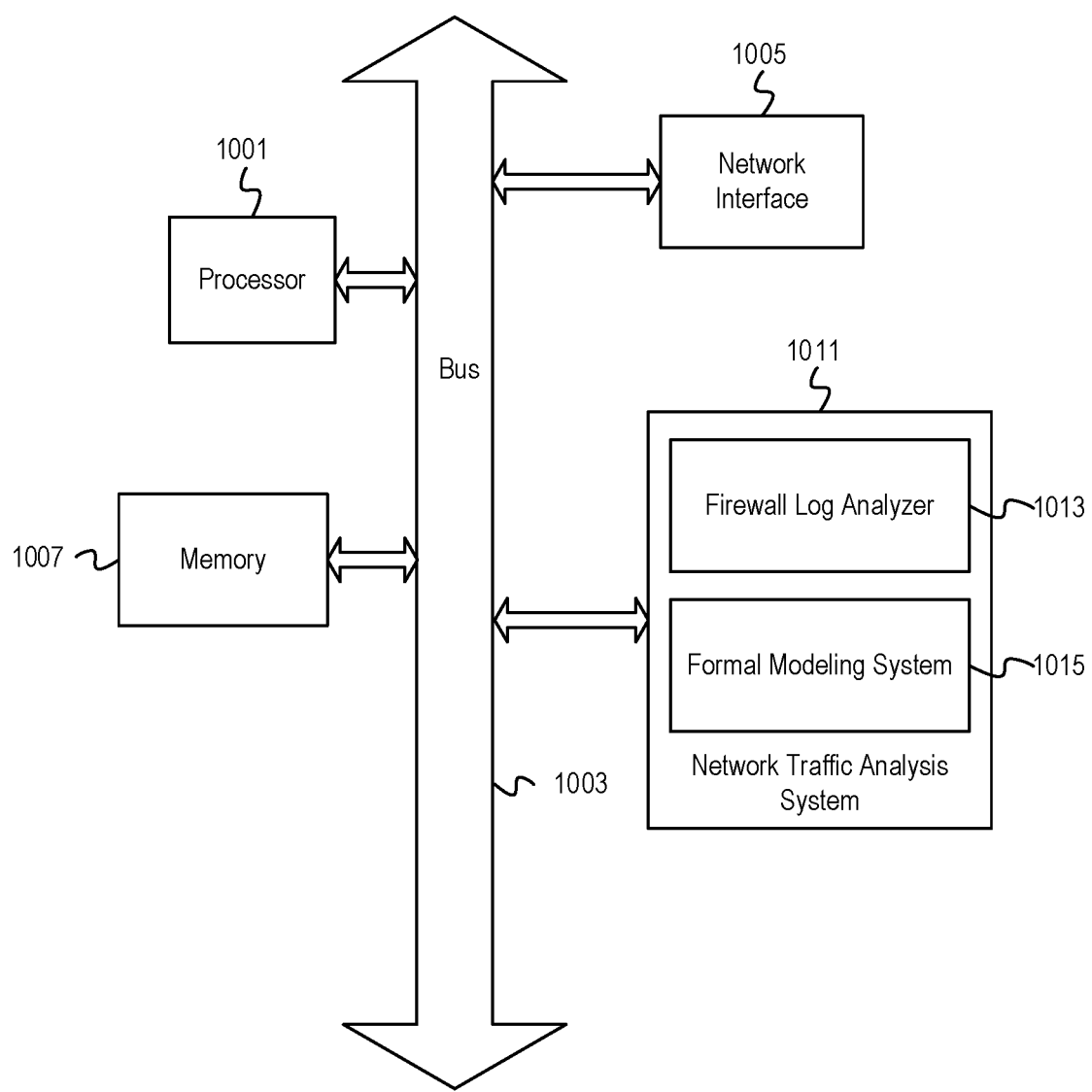
FIG. 10 depicts an example computer system with a network traffic analysis system.

FIG. 10 depicts an example computer system with a network traffic analysis system. The computer system includes a processor 1001 (possibly including multiple processors, multiple cores, multiple nodes, and/or implementing multi-threading, etc.). The computer system includes memory 1007. The memory 1007 may be system memory or any one or more of the above already described possible realizations of machine-readable media. The computer system also includes a bus 1003 and a network interface 1005. The system also includes network traffic analysis system 1011. The network traffic analysis system 1011 analyzes both detected and potential network traffic based on a combination of machine learning and formal techniques to provide insights into network behaviors and firewall configuration. The network traffic analysis system 1011 includes a firewall log analyzer 1013, and a formal modeling system 1015. The firewall log analyzer 1013 generates vectors representing entries traffic logs generated by a firewall to facilitate cluster analysis of the generated vectors for identification of similar network traffic and outliers representing potentially anomalous network traffic. The formal modeling system 1015 generates a formal model comprising formula representations of firewall rules to facilitate analysis of potential/hypothetical network traffic. Any one of the previously described functionalities may be partially (or entirely) implemented in hardware and/or on the processor 1001. For example, the functionality may be implemented with an application specific integrated circuit, in logic implemented in the processor 1001, in a co-processor on a peripheral device or card, etc. Further, realizations may include fewer or additional components not illustrated in FIG. 10 (e.g., video cards, audio cards, additional network interfaces, peripheral devices, etc.). The processor 1001 and the network interface 1005 are coupled to the bus 1003. Although illustrated as being coupled to the bus 1003, the memory 1007 may be coupled to the processor 1001.

While the aspects of the disclosure are described with reference to various implementations and exploitations, it will be understood that these aspects are illustrative and that the scope of the claims is not limited to them. In general, techniques for combined machine learning- and security rule-based network traffic analysis as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
parsing a plurality of security rules indicated in a current configuration of a firewall, wherein each security rule indicates first criteria for network traffic and a corresponding action to be taken by the firewall on network traffic satisfying the first criteria;
generating a plurality of formulas to represent the plurality of security rules, wherein each formula comprises a logical representation of the first criteria of the security rule represented by the formula and an indication of the corresponding action;
based on submission of a first query indicating second criteria for network traffic, determining if the firewall has detected network traffic satisfying the second criteria based on traffic logs generated by the firewall;
based on determining that the firewall has not detected network traffic satisfying the second criteria, evaluating the first query based on the plurality of formulas to determine if the firewall could detect network traffic satisfying the second criteria with the current configuration of the firewall, wherein evaluating the first query to determine if the firewall could detect network traffic satisfying the second criteria with the current configuration of the firewall comprises determining if the second criteria are satisfiable;
based on determining that the second criteria are satisfiable, determining an action that the firewall would take for network traffic that satisfy the second criteria based on a result of the evaluating; and
indicating the action that the firewall would take for network traffic that satisfies the second criteria if it were detected with the current configuration of the firewall.

2. The method of claim 1, wherein determining if the second criteria are satisfiable comprises,
converting the second criteria to a first-order or propositional logic representation; and
evaluating the converted second criteria and the plurality of formulas with a satisfiability modulo theories (SMT) solver,
wherein the result of the evaluating indicates whether or not the second criteria are satisfiable.

3. The method of claim 2, wherein determining if the second criteria are satisfiable comprises determining if the result of the evaluating indicates that the second criteria are satisfiable, wherein a result of the evaluating indicating that the second criteria are satisfiable comprises an indication of network traffic that satisfies the second criteria and the action which the firewall would take on the network traffic if it were detected.

4. The method of claim 2 further comprising,
based on determining that the result of the evaluation indicates that the second criteria are not satisfiable, indicating that network traffic satisfying the second criteria could not be detected by the firewall with the current configuration.

5. The method of claim 1 further comprising,
training a neural network to generate vectors representing a plurality of values recorded in the traffic logs; and
based on determining that the firewall could detect network traffic satisfying the second criteria, providing an indication of the network traffic that satisfies the second criteria as training data for further training of the neural network,
wherein training the neural network comprises training the neural network on entries recorded in the traffic logs.

6. The method of claim 1, wherein generating the plurality of formulas comprises, for each security rule of the plurality of security rules, converting the first criteria of the security rule to the logical representation of the first criteria,
wherein an antecedent of the corresponding one of the plurality of formulas corresponds to the logical representation of the first criteria and a consequent of the corresponding one of the plurality of formulas corresponds to the indication of the corresponding action.

7. The method of claim 6, wherein the logical representation of the first criteria comprises a first-order or propositional logic representation of the first criteria.

8. The method of claim 1 further comprising,
determining a plurality of configuration elements indicated in the current configuration of the firewall and corresponding values of each of the plurality of configuration elements,
wherein generating the plurality of formulas further comprises generating, for each of the plurality of configuration elements, a formula comprising an indication of the configuration element and an indication of the corresponding values as a domain of values for the configuration element.

9. The method of claim 8, wherein the plurality of configuration elements comprises one or more of protocols, port numbers, security zones, network addresses, and user groups indicated in the current configuration of the firewall.

10. One or more non-transitory machine-readable media comprising program code to:
generate, using a trained model, a first plurality of vectors representing a plurality of traffic log entries recorded by a firewall securing a network, wherein the trained model was trained with the plurality of traffic log entries;
parse a plurality of security rules indicated in a current configuration of the firewall to generate parsed representations of the plurality of security rules, each of the plurality of security rules comprising first criteria and a corresponding firewall action;
generate a plurality of formulas representing the plurality of security rules based on the parsed representations, each of the plurality of formulas comprising a logical representation of the first criteria and an indication of the firewall action included in the corresponding one of the plurality of security rules;
based on submission of a query indicating second criteria, determine whether network traffic satisfying the second criteria has been detected for the network or has not been but could be detected for the network by the firewall with the current configuration of the firewall based on evaluation of the second criteria with at least one of the first plurality of vectors and the plurality of formulas, wherein the program code to determine whether network traffic satisfying the second criteria has not been but could be detected for the network comprises program code to determine whether the second criteria are satisfiable;
based on a determination that network traffic satisfying the second criteria has been detected, determine a first action taken by the firewall for the network traffic;
based on a determination that the second criteria are satisfiable, determine a second action that the firewall would take for network traffic satisfying the second criteria if network traffic satisfying the second criteria were detected by the firewall with the current configuration; and
indicate whether network traffic satisfying the second criteria was detected for the network or could be detected for the network by the firewall with the current configuration of the firewall and a respective one of the first and second actions based on a result of the evaluation.

11. The non-transitory machine-readable media of claim 10, wherein the program code to determine whether the second criteria are satisfiable comprises program code to,
convert the second criteria to a first-order or propositional logic representation; and
evaluate the converted second criteria and the plurality of formulas with a satisfiability modulo theories (SMT) solver,
wherein the result of the evaluation indicates whether or not the second criteria are satisfiable.

12. The non-transitory machine-readable media of claim 11,
wherein the program code to determine whether network traffic satisfying the second criteria could be detected for the network comprises program code to determine whether the result of the evaluation indicates that the second criteria are satisfiable,
wherein a result of the evaluation indicating that the second criteria are satisfiable comprises an indication of network traffic that satisfies the second criteria and the second action as an action which the firewall would take on the network traffic if it were detected.

13. The non-transitory machine-readable media of claim 10 further comprising program code to generate the trained model,
wherein the program code to generate the trained model comprises program code to train a neural network to generate a second plurality of vectors representing a plurality of values recorded in the traffic logs,
wherein the program code to generate the first plurality of vectors comprises program code to, for each of the plurality of traffic log entries, combine corresponding ones of the second plurality of vectors representing values recorded in the traffic log entry.

14. The non-transitory machine-readable media of claim 13 further comprising program code to, based on a determination that network traffic satisfying the second criteria could be detected, providing an indication of the network traffic that satisfies the second criteria as training data for further training of the trained model.

15. The non-transitory machine-readable media of claim 10, wherein the program code to determine whether network traffic satisfying the second criteria has been detected for the network comprises program code to determine whether any of the first plurality of vectors indicate network traffic recorded in traffic log entries which satisfies the second criteria.

16. An apparatus comprising:
a processor; and
a computer-readable medium having instructions stored thereon that are executable by the processor to cause the apparatus to,
parse a plurality of security rules indicated in a current configuration of a firewall, wherein each security rule indicates first criteria for network traffic and a corresponding action to be taken by the firewall on network traffic satisfying the first criteria;
generate a plurality of formulas to represent the plurality of security rules, wherein each formula comprises a logical representation of the first criteria of the security rule represented by the formula and an indication of the corresponding action;
based on submission of a first query indicating second criteria for network traffic, determine if the firewall has detected network traffic satisfying the second criteria based on traffic logs generated by the firewall;
based on a determination that the firewall has not detected network traffic satisfying the second criteria, evaluate the first query based on the plurality of formulas to determine if the firewall could detect network traffic satisfying the second criteria with the current configuration of the firewall, wherein the instructions to evaluate the first query comprise instructions to determine if the second criteria are satisfiable;
based on a determination that the second criteria are satisfiable, determine an action that the firewall would take for network traffic that satisfies the second criteria if it were detected by the firewall with the current configuration of the firewall based on a result of evaluation of the first query; and
indicate the action that the firewall would take for network traffic satisfying the second criteria if it were detected by the firewall with the current configuration based on the evaluation of the first query based on the plurality of formulas.

17. The apparatus of claim 16, wherein the instructions executable by the processor to cause the apparatus to determine if the second criteria are satisfiable comprise instructions executable by the processor to cause the apparatus to,
convert the second criteria to a first-order or propositional logic representation; and
evaluate the converted second criteria and the plurality of formulas with a satisfiability modulo theories (SMT) solver,
wherein the result of the evaluation indicates whether or not the second criteria are satisfiable.

18. The apparatus of claim 17,
wherein the instructions executable by the processor to cause the apparatus to determine if the firewall could detect network traffic satisfying the second criteria comprise instructions executable by the processor to cause the apparatus to determine if the result of the evaluation indicates that the second criteria are satisfiable,
wherein a result of the evaluation indicating that the second criteria are satisfiable comprises an indication of network traffic that satisfies the second criteria and the action which the firewall would take on the network traffic if it were detected.

19. The apparatus of claim 16 further comprising instructions executable by the processor to cause the apparatus to,
train a neural network to generate vectors representing a plurality of values recorded in the traffic logs; and
based on a determination that the firewall could detect network traffic satisfying the second criteria, provide an indication of the network traffic that satisfies the second criteria as training data for further training of the neural network,
wherein the instructions to train the neural network comprise instructions to train the neural network on entries recorded in the traffic logs.

20. The apparatus of claim 16, wherein the instructions executable by the processor to cause the apparatus to generate the plurality of formulas comprise instructions executable by the processor to cause the apparatus to, for each security rule of the plurality of security rules, convert the first criteria of the security rule to the logical representation of the first criteria,
wherein an antecedent of the corresponding one of the plurality of formulas corresponds to the logical representation of the first criteria and a consequent of the corresponding one of the plurality of formulas corresponds to the indication of the corresponding action.

* * * * *